(12) United States Patent
Chen

(10) Patent No.: US 9,721,527 B2
(45) Date of Patent: Aug. 1, 2017

(54) ELECTROCHROMIC DISPLAY PANEL, DRIVING METHOD THEREOF AND DISPLAY DEVICE

(71) Applicant: Boe Technology Group Co., Ltd., Beijing (CN)

(72) Inventor: Juan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/913,305

(22) PCT Filed: Aug. 19, 2015

(86) PCT No.: PCT/CN2015/087506
§ 371 (c)(1),
(2) Date: Feb. 19, 2016

(87) PCT Pub. No.: WO2016/165254
PCT Pub. Date: Oct. 20, 2016

(65) Prior Publication Data
US 2017/0061919 A1    Mar. 2, 2017

(30) Foreign Application Priority Data

Apr. 17, 2015  (CN) .......................... 2015 1 0185662

(51) Int. Cl.
*G09G 3/38* (2006.01)
*G02F 1/163* (2006.01)
(Continued)

(52) U.S. Cl.
CPC ............. *G09G 3/38* (2013.01); *G02F 1/0105* (2013.01); *G02F 1/15* (2013.01); *G02F 1/163* (2013.01);
(Continued)

(58) Field of Classification Search
CPC ........ G09G 3/38; G09G 3/344; G02F 1/0105; G02F 1/15; G02F 1/163; G02F 1/1533; G02F 1/13318
(Continued)

(56) References Cited

U.S. PATENT DOCUMENTS 9,224,343 B2 * 12/2015 Andersson
                                Ersman .................. G09G 3/344
2004/0017347 A1   1/2004 Hougham et al.
(Continued)

FOREIGN PATENT DOCUMENTS

CN          101216652 A       7/2008
CN          101303503 A      11/2008
(Continued)

OTHER PUBLICATIONS

International Search Report and Written Opinion from PCT/CN15/87506 dated Jan. 6, 2016.
(Continued)

*Primary Examiner* — Fred Tzeng
(74) *Attorney, Agent, or Firm* — Calfee, Halter & Griswold LLP

(57) ABSTRACT

The embodiments of the present invention disclose an electrochromic display panel, a driving method thereof and a display device; the electrochromic display panel comprises: a first substrate and a second substrate arranged with box alignment; the first substrate being divided into a plurality of pixel units; a plurality of electrochromic strips made of a black electrochromic material are arranged in each pixel unit of the first substrate; a electrochromic layer made of the black electrochromic material is arranged on the second substrate; the black electrochromic material presents a transparent state when it is powered off, and presents a black state when it is powered on. The electrochromic
(Continued)

display panel provided by the embodiment of the present invention realizes both color display and black display with one electrochromic material; compared with the prior art, the embodiment of the present invention has advantages of low cost, stable luminous efficiency and simple driving mode.

15 Claims, 3 Drawing Sheets

(51) Int. Cl.
  *G02F 1/01* (2006.01)
  *G02F 1/15* (2006.01)
(52) U.S. Cl.
  CPC ............ *G09G 2320/0238* (2013.01); *G09G 2320/0666* (2013.01)
(58) Field of Classification Search
  USPC ......................................... 345/690
  See application file for complete search history.

(56) References Cited

U.S. PATENT DOCUMENTS

| | | | | |
|---|---|---|---|---|
| 2006/0256250 | A1* | 11/2006 | Kameyama | G02F 1/136286 349/43 |
| 2008/0278792 | A1* | 11/2008 | Jang | G02F 1/15 359/266 |
| 2011/0261303 | A1* | 10/2011 | Jang | G02F 1/13318 349/108 |
| 2012/0212793 | A1* | 8/2012 | Andersson Ersman | G02F 1/1533 359/268 |
| 2012/0218495 | A1* | 8/2012 | Oshima | H01L 27/1225 349/61 |
| 2013/0215004 | A1* | 8/2013 | Nordlinder | G09G 3/38 345/105 |
| 2014/0133006 | A1* | 5/2014 | Malmstrom | G02F 1/15 359/269 |
| 2015/0279918 | A1* | 10/2015 | Teraguchi | H01L 27/3276 257/40 |
| 2015/0338714 | A1* | 11/2015 | Li | G02F 1/133514 349/43 |

FOREIGN PATENT DOCUMENTS

| | | |
|---|---|---|
| CN | 103217832 A | 7/2013 |
| CN | 103472648 | 12/2013 |
| CN | 103760730 A | 4/2014 |
| CN | 103869569 | 6/2014 |
| CN | 104238223 A | 12/2014 |
| CN | 104749850 | 7/2015 |
| TW | 201227129 A | 7/2012 |
| WO | 2013/161547 | 10/2013 |

OTHER PUBLICATIONS

First Office Action from Chinese Patent Application No. 201510185662.5 dated Apr. 5, 2017.

* cited by examiner

ELECTROCHROMIC DISPLAY PANEL, DRIVING METHOD THEREOF AND DISPLAY DEVICE

RELATED APPLICATIONS

The present application is the U.S. national phase entry of PCT/CN2015/087506 with an International filing date of Aug. 19, 2015, which claims the benefit of Chinese Application No. 201510185662.5, filed Apr. 17, 2015, the entire disclosures of which are incorporated herein by reference.

FIELD OF THE INVENTION

The present invention relates to the field of display technology, particularly to an electrochromic display panel, a driving method thereof and a display device.

BACKGROUND OF THE INVENTION

An existing electrochromic display device needs electrochromic materials with three colors to realize color display. As shown in FIG. 1A-FIG. 1b, the incident light is usually white light; when the electrochromic materials are powered on, the red electrochromic material 11, green electrochromic material 12 and blue electrochromic material 13 present red, green and blue states respectively, thereby transmitting red light, green light and blue light, realizing color display; when the electrochromic materials are powered off, transparent display is realized.

The existing electrochromic display device has the following defects: it can not realize black display (i.e., presenting a dark state); moreover, since the luminous efficiencies of the red, green and blue electrochromic materials are inconsistent, driving of the color electrochromic display device is relatively complicated.

SUMMARY OF THE INVENTION

It is desired to provide an electrochromic display panel, a driving method thereof and a display device; color display and black display can be realized with one electrochromic material, while the driving method is simple.

To this end, in a first aspect of the present invention, an electrochromic display panel is provided; the electrochromic display panel comprises: a first substrate and a second substrate arranged with box alignment; the first substrate being divided into a plurality of pixel units; a plurality of electrochromic strips made of a black electrochromic material are arranged in each pixel unit of the first substrate; a electrochromic layer made of the black electrochromic material is arranged on the second substrate; the black electrochromic material presents a transparent state when it is powered off, and presents a black state when it is powered on.

Optionally, the plurality of electrochromic strips are arranged on a side of the pixel unit facing the second substrate; the electrochromic layer is arranged on a side of the second substrate facing the first substrate; a transparent electrolyte solution is filled between the first substrate and the second substrate.

Optionally, a metal material is arranged between the electrochromic strips and the first substrate.

Optionally, the metal material comprises aluminum.

In a second aspect of the present invention, a display device is provided; the display device comprises the above mentioned electrochromic display panel.

Optionally, the display device further comprises a backlight; the backlight being arranged on the outer side of the first substrate, and capable of emitting white light toward the first substrate.

Optionally, the display device further comprises a driving circuit; the driving circuit being used for controlling the respective electrochromic strips in each pixel unit such that the respective electrochromic strips can be powered on or powered off independently of each other.

In a third aspect of the present invention, a driving method for the electrochromic display panel as described above is provided; the driving method comprises:

illuminating the electrochromic display panel with white light from the outer side of the first substrate;

if color display is required to be realized:

keeping the electrochromic layer of the second substrate in a powered off state;

respectively powering on a group of electrochromic strips with a preset interval in each pixel unit according to a gray scale signal, such that a grating with a preset grating pitch is formed in each pixel unit; when the white light passes through the grating with the preset grating pitch, light with a preset color is generated by a corresponding pixel unit;

if black display is required to be realized:

powering on the electrochromic layer of the second substrate.

Optionally, if black display is required to be realized, the driving method further comprises:

keeping all of the electrochromic strips on the first substrate in a powered off state.

Optionally, if red light is required to be generated by the pixel unit:

powering on a group of electrochromic strips with an interval of 70-100 nm in the pixel unit.

Optionally, if green light is required to be generated by the pixel unit:

powering on a group of electrochromic strips with an interval of 100-130 nm in the pixel unit.

Optionally, if blue light is required to be generated by the pixel unit:

powering on a group of electrochromic strips with an interval of 130-160 nm in the pixel unit.

The electrochromic display panel provided by the embodiment of the present invention realizes both color display and black display with one electrochromic material; compared with the prior art, the embodiment of the present invention has advantages of low cost, stable luminous efficiency and simple driving mode.

BRIEF DESCRIPTION OF THE DRAWINGS

In order to more clearly understand the objects, features and advantages of the disclosure, the technical solutions in embodiments of the invention will be described clearly and completely in connection with the drawings in the embodiments of the invention. The drawings do not aim for limiting the scope of the present invention.

REFERENCE SIGNS

11—red electrochromic material; 12—green electrochromic material; 13—blue electrochromic material; 21—first substrate; 22—second substrate; 23—electrochromic strips; 24—electrochromic layer; 25—metal material.

DETAILED DESCRIPTION OF THE INVENTION

The specific implementations of the present invention will be explained in detail below with reference to the drawings. It should be noted that the described specific implementations are only used for illustrating and explaining the embodiments of the present invention, rather than limiting the scope of the present invention.

Figure 1A:
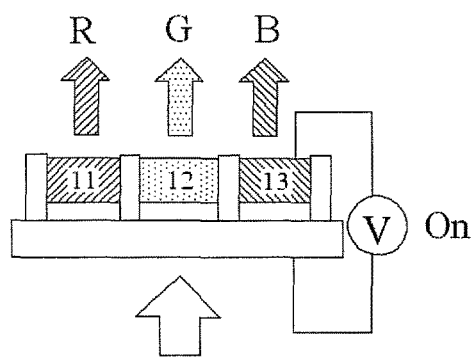
FIG. 1a and FIG. 1b are structural schematic diagrams of an existing electrochromic display device.
Figure 1B:
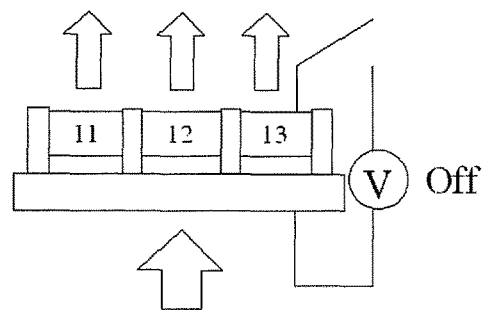
Figure 2:
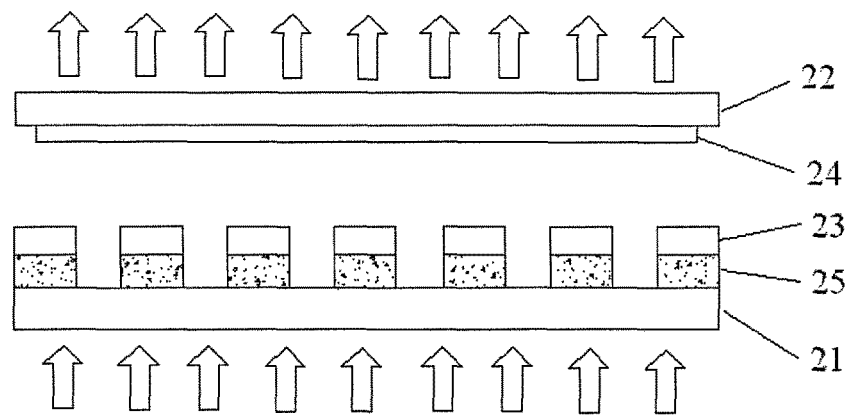
FIG. 2 is a structural schematic diagram of a single pixel unit in the electrochromic display panel provided by the embodiment of the present invention.
Figure 3:
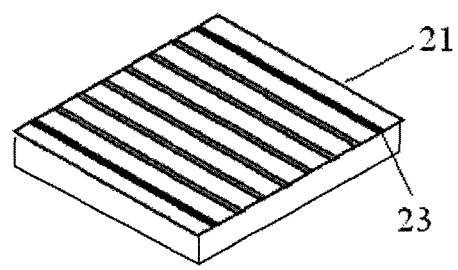
FIG. 3 is a local schematic diagram of a single pixel unit in the electrochromic display panel provided by the embodiment of the present invention.

An electrochromic display panel is provided by an embodiment of the present invention; FIG. 2 is a structural schematic diagram of a single pixel unit in the electrochromic display panel. The electrochromic display panel comprises: a first substrate 21 and a second substrate 22 arranged with box alignment; the first substrate 21 being divided into a plurality of pixel units; FIG. 3 is a local schematic diagram of a single pixel unit in the electrochromic display panel; a plurality of electrochromic strips 23 made of a black electrochromic material are arranged in each pixel unit of the first substrate 21; a electrochromic layer 24 made of the black electrochromic material is arranged on the second substrate 22 (not shown in FIG. 3).

The black electrochromic material presents a transparent state when it is powered off, and presents a black state when it is powered on. FIG. 2 shows a situation in which all the electrochromic strips 23 and electrochromic layer 24 are powered off; white light is applied for illuminating, the electrochromic strips 23 and electrochromic layer 24 present a transparent state when powered off; therefore, the emitted light is still white light, realizing transparent state display.

Wherein the electrochromic layer 24 can be arranged covering each pixel unit separately, the electrochromic layer 24 can also be arranged as a continuous layer corresponding to the entire area of the second substrate.

When the above mentioned electrochromic display panel is applied for realizing color display: the electrochromic layer 24 of the second substrate 22 is kept in a powered off state (i.e., transparent state); as for the pixel units on the first substrate 21, electrochromic strips with different intervals are powered on, such that gratings with different grating pitches are formed. White light is applied for illuminating; when the white light passes through the grating with the preset grating pitch, light with a preset color can be formed due to diffraction; therefore light with a preset color is generated by a corresponding pixel unit, realizing color display.

Figure 4:
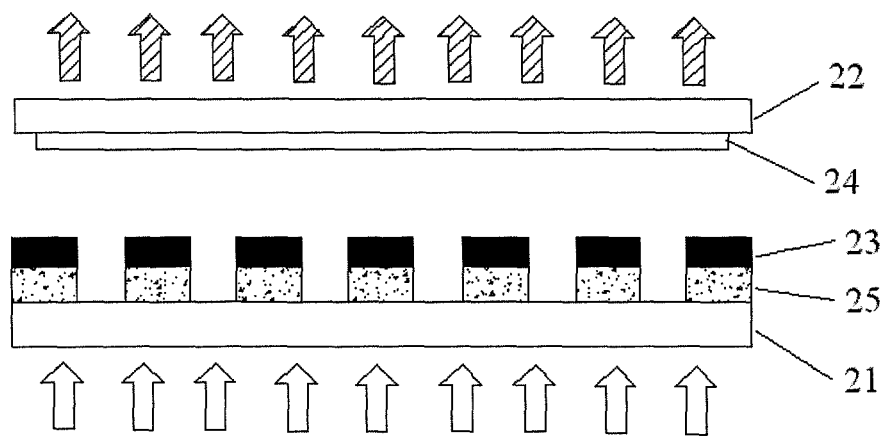
FIG. 4 is a schematic diagram of a single pixel unit in the electrochromic display panel provided by the embodiment of the present invention, realizing red display.
Figure 5:
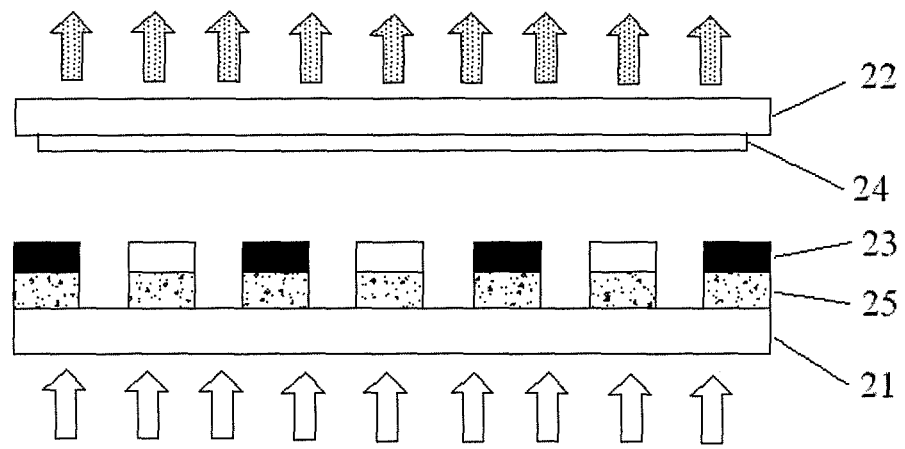
FIG. 5 is a schematic diagram of a single pixel unit in the electrochromic display panel provided by the embodiment of the present invention, realizing green display.
Figure 6:
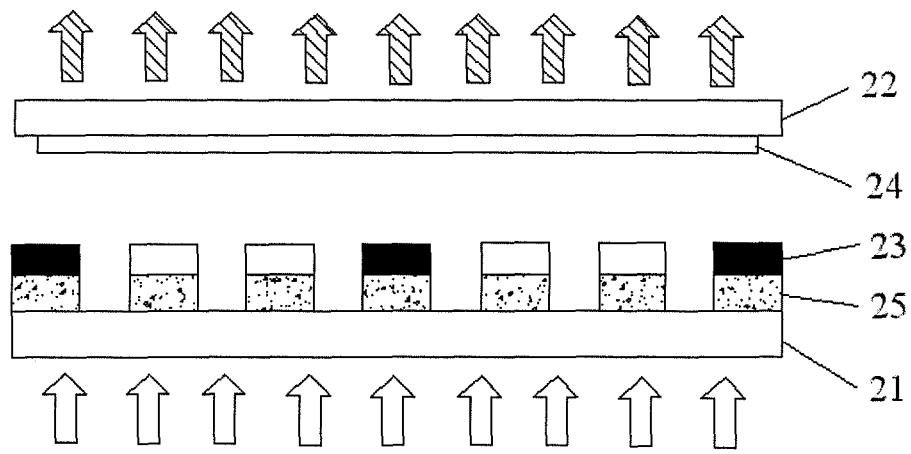
FIG. 6 is a schematic diagram of a single pixel unit in the electrochromic display panel provided by the embodiment of the present invention, realizing blue display.

For example, FIG. 4-FIG. 6 are schematic diagrams of a single pixel unit realizing red, green and blue display respectively. In these drawings, the electrochromic strips 23 presenting "black" indicates a powered on state; the electrochromic strips 23 presenting "white" indicates a powered off state. Typically, the smaller the interval of the powered on electrochromic strips 23, the larger the wavelength of the emitted light after white light diffraction is. If the interval of the powered on electrochromic strips 23 is in a range of 70-100 nm, red light is emitted after white light diffraction, as shown in FIG. 4; if the interval of the powered on electrochromic strips 23 is in a range of 100-130 nm, green light is emitted after white light diffraction, as shown in FIG. 5; if the interval of the powered on electrochromic strips 23 is in a range of 130-160 nm, blue light is emitted after white light diffraction, as shown in FIG. 6.

Figure 7:
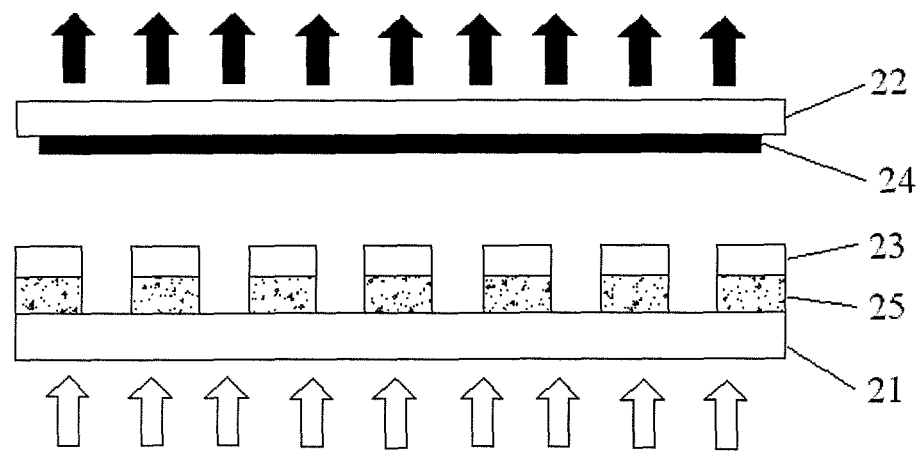
FIG. 7 is a schematic diagram of a single pixel unit in the electrochromic display panel provided by the embodiment of the present invention, realizing black display.

When the above mentioned electrochromic display panel is applied for realizing black display, only the electrochromic layer 24 of the second substrate should be powered on; the electrochromic layer 24 presents a black state when powered on, no light can pass through the electrochromic layer 24, thereby realizing black display, as shown in FIG. 7.

The electrochromic display panel provided by the embodiment of the present invention realizes both color display and black display with one electrochromic material; compared with the prior art, the embodiment of the present invention has advantages of low cost, stable luminous efficiency and simple driving mode.

The specific form of the black electrochromic material is not limited herein; the black electrochromic material can be selected from organic electrochromic materials or inorganic electrochromic materials, provided that it can convert between a black state and a transparent state when powered on and powered off.

Further, the plurality of electrochromic strips 23 are arranged on a side of the pixel unit facing the second substrate 22; the electrochromic layer 24 is arranged on a side of the second substrate 22 facing the first substrate 21; a transparent electrolyte solution is filled between the first substrate 21 and the second substrate 22. The transparent electrolyte solution is used for increasing the electron transport efficiency, thereby improving the luminous efficiency of the electrochromic display panel.

Optionally, in order to further increase the electron transport efficiency, in an embodiment of the present invention, a metal material 25 is arranged between the electrochromic strips 23 and the first substrate 21. Typically, the shape of the metal material 25 is consistent with the shape of the electrochromic strip 23 (as shown in FIG. 2), thereby increasing the electron transport efficiency to the greatest extent, and improving the luminous efficiency of the electrochromic display panel. Optionally, the metal material 25 comprises aluminum.

A display device is provided by an embodiment of the present invention; the display device comprises the above mentioned electrochromic display panel. As stated above, the display device realizes both color display and black display with one electrochromic material, having advantages of low cost, stable luminous efficiency and simple driving mode.

Optionally, the display device further comprises a backlight; the backlight being arranged on the outer side of the first substrate 21, and capable of emitting white light toward the first substrate 21. It should be noted that the incident light provided to the electrochromic display panel can also be the ambient light.

Optionally, the display device further comprises a driving circuit; the driving circuit being used for controlling the respective electrochromic strips 23 in each pixel unit such that the respective electrochromic strips can be powered on or powered off independently of each other. Apparently, the driving circuit can also be used for controlling the electrochromic layer 24 such that the electrochromic layer 24 can be powered on or powered off independently.

A driving method for the electrochromic display panel as described above is provided by an embodiment of the present invention; the driving method comprises:

illuminating the electrochromic display panel with white light from the outer side of the first substrate 21;

if color display is required to be realized:

keeping the electrochromic layer 24 of the second substrate 22 in a powered off state (i.e., transparent state);

respectively powering on a group of electrochromic strips 23 with a preset interval in each pixel unit according to a gray scale signal, such that a grating with a preset grating pitch is formed in each pixel unit; when the white light passes through the grating with the preset grating pitch, light with a preset color is generated by a corresponding pixel unit;

if black display is required to be realized:

powering on the electrochromic layer 24 of the second substrate 22; therefore the electrochromic layer 24 presents a black state, no light can pass through the electrochromic layer 24.

The embodiments of the present invention realize both color display and black display with one electrochromic material, having advantages of low cost, stable luminous efficiency and simple driving mode.

Optionally, if black display is required to be realized, the driving method further comprises:

keeping all of the electrochromic strips 23 on the first substrate 21 in a powered off state.

In the embodiments of the present invention, to realize black display: only the electrochromic layer 24 of the second substrate 22 should be powered on; while the electrochromic strips 23 on the first substrate 21 can either be powered on or be powered off, without affecting the effect of black display. However, the electrochromic strips 23 can be in a powered off state for saving energy and reducing power consumption.

In particular, if red light is required to be generated by the pixel unit:

a group of electrochromic strips with an interval of 70-100 nm in the pixel unit are powered on, as shown in FIG. 4.

If green light is required to be generated by the pixel unit:

a group of electrochromic strips with an interval of 100-130 nm in the pixel unit are powered on, as shown in FIG. 5.

If blue light is required to be generated by the pixel unit:

a group of electrochromic strips with an interval of 130-160 nm in the pixel unit are powered on, as shown in FIG. 6.

In the embodiments of the present invention, the effect of red, green and blue sub pixels in a filter layer can be realized only by enabling three adjacent pixels emitting red, green and blue light respectively, thereby realizing color display. Compared with the prior art, the electrochromic display panel and display device provided by the embodiment of the present invention can also realize black display, with a simple driving mode.

It should be noted that the described specific implementations are only used for illustrating and explaining the principle of the present invention, rather than limiting the scope of the present invention. Apparently, the skilled person in the art can make various modifications and variations to the present invention without departing from the spirit and scope of the present invention. In this way, provided that these modifications and variations of the present invention belong to the scopes of the claims of the present invention and the equivalent technologies thereof, the present invention also intends to cover these modifications and variations.

The invention claimed is:

1. An electrochromic display panel, comprising: a first substrate and a second substrate arranged with box alignment; the first substrate being divided into a plurality of pixel units; wherein a plurality of electrochromic strips made of a black electrochromic material are arranged in each pixel unit of the first substrate; a electrochromic layer made of the black electrochromic material is arranged on the second substrate; the black electrochromic material presents a transparent state when it is powered off, and presents a black state when it is powered on.

2. The electrochromic display panel as claimed in claim 1, wherein the plurality of electrochromic strips are arranged on a side of the pixel unit facing the second substrate; the electrochromic layer is arranged on a side of the second substrate facing the first substrate; a transparent electrolyte solution is filled between the first substrate and the second substrate.

3. The electrochromic display panel as claimed in claim 1, wherein a metal material is arranged between the electrochromic strips and the first substrate.

4. The electrochromic display panel as claimed in claim 3, wherein the metal material comprises aluminum.

5. A display device, comprising the electrochromic display panel as claimed in claim 1.

6. The display device as claimed in claim 5, wherein the display device further comprising a backlight; the backlight being arranged on the outer side of the first substrate, and capable of emitting white light toward the first substrate.

7. The display device as claimed in claim 6, wherein the display device further comprising a driving circuit; the driving circuit being used for controlling the respective electrochromic strips in each pixel unit such that the respective electrochromic strips can be powered on or powered off independently of each other.

8. The display device as claimed in claim 5, wherein the plurality of electrochromic strips are arranged on a side of the pixel unit facing the second substrate; the electrochromic layer is arranged on a side of the second substrate facing the first substrate; a transparent electrolyte solution is filled between the first substrate and the second substrate.

9. The display device as claimed in claim 5, wherein a metal material is arranged between the electrochromic strips and the first substrate.

10. The display device as claimed in claim 9, wherein the metal material comprises aluminum.

11. A driving method for the electrochromic display panel as claimed in claim 1, wherein the driving method comprises:

illuminating the electrochromic display panel with white light from the outer side of the first substrate;

if color display is required to be realized:

keeping the electrochromic layer of the second substrate in a powered off state;

respectively powering on a group of electrochromic strips with a preset interval in each pixel unit according to a gray scale signal, such that a grating with a preset grating pitch is formed in each pixel unit; when the white light passes through the grating with the preset grating pitch, light with a preset color is generated by a corresponding pixel unit;

if black display is required to be realized:

powering on the electrochromic layer of the second substrate.

12. The driving method as claimed in claim 11, wherein if black display is required to be realized, the driving method further comprises:

keeping all of the electrochromic strips on the first substrate in a powered off state.

13. The driving method as claimed in claim 11, wherein if red light is required to be generated by the pixel unit:

powering on a group of electrochromic strips with an interval of 70-100 nm in the pixel unit.

14. The driving method as claimed in claim 11, wherein if green light is required to be generated by the pixel unit:

powering on a group of electrochromic strips with an interval of 100-130 nm in the pixel unit.

15. The driving method as claimed in claim 11, wherein if blue light is required to be generated by the pixel unit:

powering on a group of electrochromic strips with an interval of 130-160 nm in the pixel unit.

* * * * *